Feb. 25, 1936.    C. LACROIX    2,032,289
HYDRAULIC SHOCK ABSORBER FOR VEHICLES
Filed Nov. 15, 1934    2 Sheets-Sheet 1
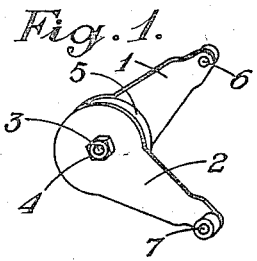
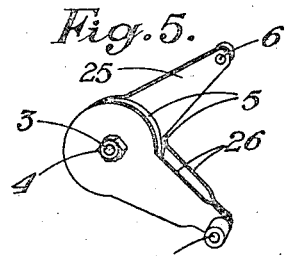
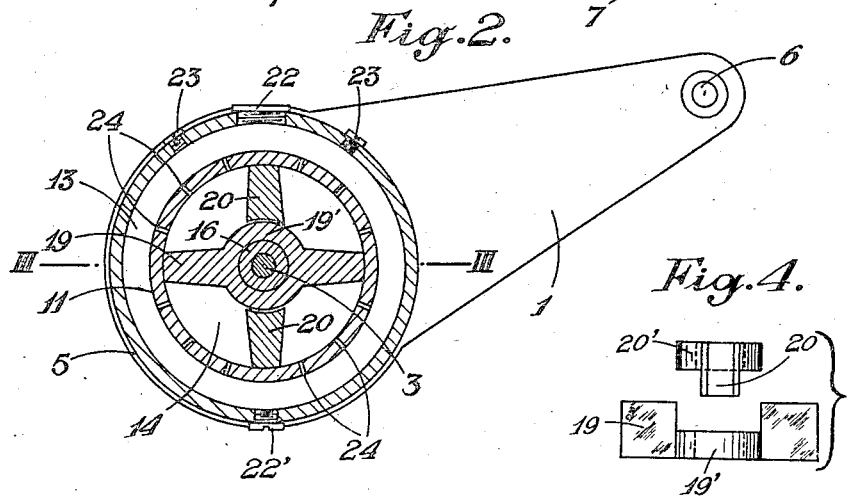
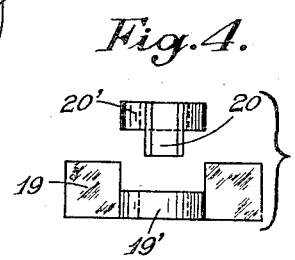
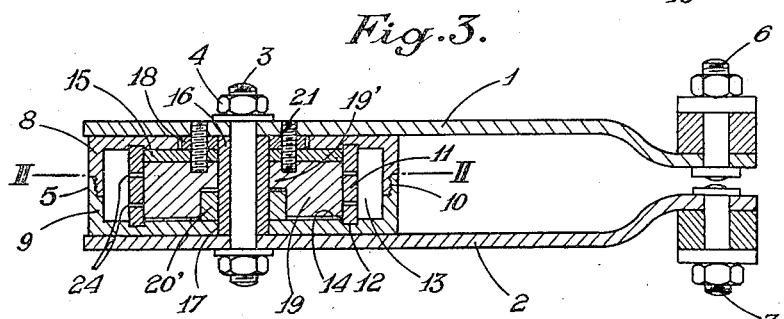
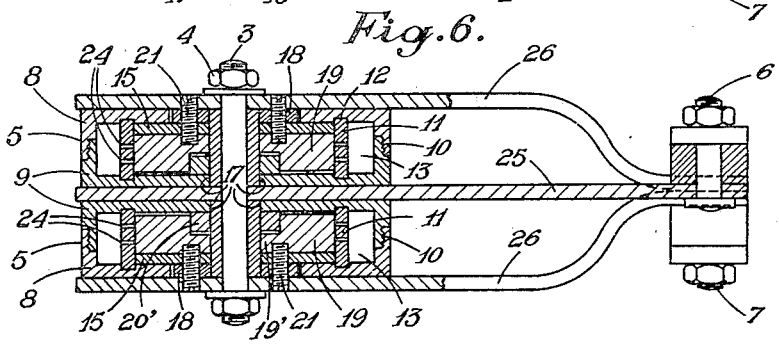
C. Lacroix
INVENTOR
By Glascock Downing & Seebold
ATTYS.

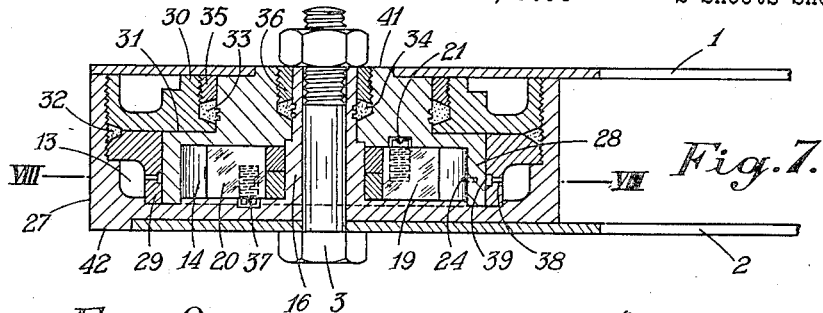
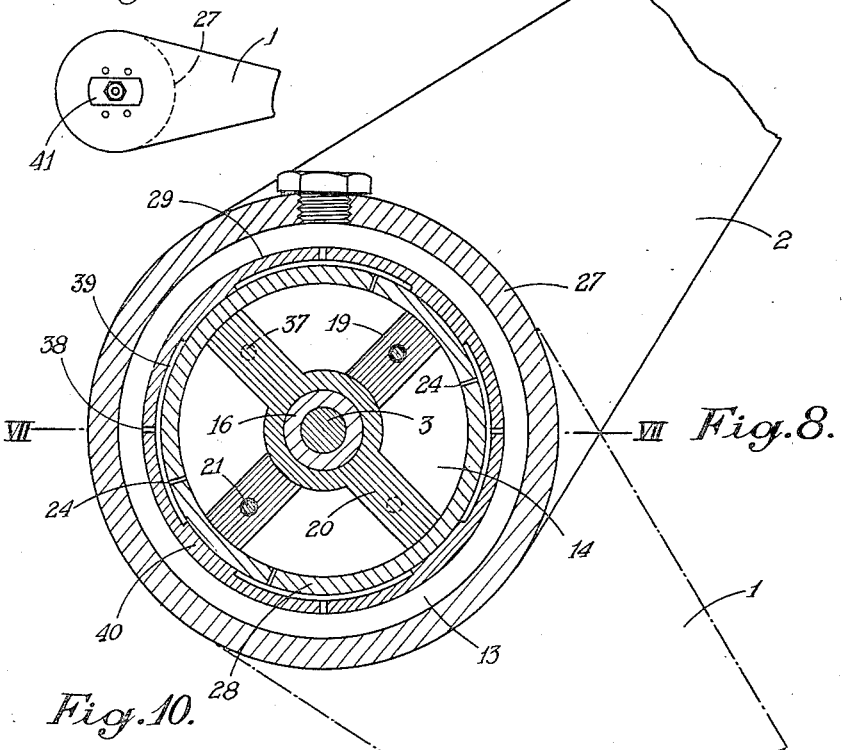
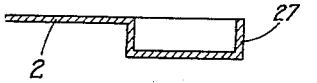
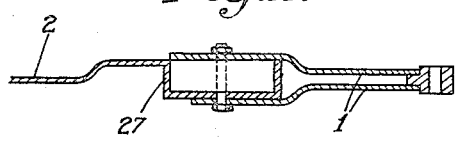

Patented Feb. 25, 1936

2,032,289

UNITED STATES PATENT OFFICE 2,032,289

HYDRAULIC SHOCK ABSORBER FOR VEHICLES

Charles Lacroix, Brussels, Belgium

Application November 15, 1934, Serial No. 753,222
In Belgium November 16, 1933

4 Claims. (Cl. 188—89)

The present invention relates to a hydraulic shock absorber for motor cars and like vehicles, which is designed to brake, in both directions of operation, the relative movements between the suspended and the nonsuspended parts of the vehicle in order to give the vehicle a great stability, more particularly when it has an independent wheel suspension. Further objects of the invention are to provide a hydraulic shock absorber that will not leak and will be adapted to retain its efficiency for any period of time.

My improved shock-absorber is of the type in which the braking action is effected by transfer of liquid through constricted openings between chambers of variable capacity formed in a casing between rotating blades which are rocked about a common axis through the relative movements occurring between the suspended and nonsuspended portions of the vehicle. According to the invention, the variable capacity chambers formed between the blades are permanently connected with each other by means of a peripheral container through which the liquid flows from one chamber to the other. The permanent connection thus provided through valveless orifices of uniform cross-section ensures an equal braking action in both directions of movement of the vanes, whilst owing to the fact that the liquid transfer takes place through a peripheral container in which said liquid is cooled, the temperature of the liquid in the working chambers of the apparatus is not liable to affect the viscosity of the liquid or to cause same to expand unduly, whereby leakages of liquid and ingress of air which might unfavourably affect the operation of the shock absorber are avoided.

According to my invention I further provide means ensuring that the casing of the shock absorber be perfectly fluidtight and that the movable members be accurately centered within each other so that the violent stresses to which they are subjected will not lead to breakage.

In the preferred embodiment of my invention the shock absorber is formed with two pivoted arms respectively connected to the suspended and the non-suspended parts of the vehicle and secured each to a pair of blades. This and other embodiments of my invention are described hereunder with reference to the accompanying drawings in which:

Fig. 1 shows a perspective small scale view of a shock absorber having a single casing, Fig. 2 is a cross section through the casing of said shock absorber on line II—II of Fig. 3, Fig. 3 is a longitudinal cross section of the entire shock absorber on line III—III of Fig. 2, Fig. 4 shows in elevation the two blades of said shock absorber, taken apart in the relative position shown in Fig. 2, Fig. 5 is a perspective view similar to Fig. 1 showing a shock absorber with a double casing, Fig. 6 is a longitudinal cross-section of said double casing shock absorber, Fig. 7 shows a diametral cross section, on line VII—VII of Fig. 8, of another embodiment of a single casing shock absorber, Fig. 8 is a transverse cross-section through said casing on line VIII—VIII of Fig. 7, and Figs. 9 to 12 are detail views illustrating various methods of assembly.

In Figs 1 to 3, 1 and 2 are the two arms of the shock absorber pivotally mounted on shaft 3 between the clamping nuts 4 and the casing 5 held between said arms. The free ends of arms 1 and 2 are respectively pivoted to the frame and to the axle of the vehicle by means of suitable pins 6 and 7.

The casing 5 comprises two cup shaped members 8, 9, screwed together at 10, and an annular wall 11 mounted in annular grooves 12 of the cup shaped members and dividing the casing into two concentric chambers 13 and 14. The inner chamber 14, enclosed within the peripheral wall 11, is closed on one side by the cup shaped member 9, on the opposite side by means of a disc 15 and centrally by a sleeve 16 mounted on shaft 3. Lateral fluid tightness of the inner chamber is ensured by the joint between sleeve 16 and the cup member 9 which may be welded as shown at 17, and by means of the joint between the other end of sleeve 16, disc 15, and a washer 18 engaging said sleeve. If required, packing may be provided at said latter end of sleeve 16, or at both ends if one of them is not welded or otherwise secured in fluid-tight manner to casing 5.

Two pairs of blades 19 and 20 cut away so that each said pair of blades encloses the hub 19' or 20' of the other, are mounted at right angles to each other on sleeve 16, and each pair may freely rotate on the sleeve to the extent permitted by the other pair of blades. The blades 19 are secured to arm 1 by means of screws 21, whilst the blades 20 are for instance welded to the cup member 9 which in turn is welded to arm 2.

In use, the chambers 13 and 14 are filled with oil or like suitable liquid, through the inlet aperture 22 arranged at the top of the casing, opposite the outlet aperture 22', until the oil begins to escape through the test holes 23, which occurs when the entire casing is filled. The chambers 13 and 14 communicate with each other through holes 24 provided in the annular wall 11 for the purpose specified hereunder.

It may easily be seen that when an angular movement is applied to arms 1 and 2, the blades 19 and 20 are moved relatively to each other within chamber 14. The oil contained in the spaces between the blades moving towards each other is forced into the peripheral container 13 through the adjacent holes 24, whilst oil is sucked out of said container 13 through other holes 24 into the spaces comprised between blades which are moving away from each other. The resistance encountered by the oil circulating through the appropriately dimensioned holes 24, exerts a braking action on the movement of the blades and consequently also on the movement of arms 1 and 2 and of the vehicle parts to which said arms are connected. The shock absorber checks or brakes in both directions the movement of each arm as well as the simultaneous movement of both arms.

The embodiment shown in Figs. 5 and 6 only differs from the previous construction showing two single side arms in that it comprises a single central arm 25 and a double arm 26 enclosing two twin coupled casings 5. Said casings may be welded to the central arm. They contain the same parts as the single casing of the shock absorber previously described and they operate in like manner. However the balanced distribution of stresses, obtained by means of a double arm enclosing a single arm avoids torsional stresses on the shock absorber.

The fluid tightness of the casing and the resistance to torsional and to wedging actions are further enhanced in the modified embodiment illustrated in Figs. 7 and 8.

In this embodiment, the chamber 14 containing the blades 19 and 20, and the peripheral chamber 13 surrounding same are both formed in the bottom of a cup member 27 having a central sleeve or boss 16 and are closed respectively by means of a bell shaped member 28 capping the sleeve 16 and of an angle ring 29 screwed in the cup member 27. Said ring 29 closely surrounds member 28 and is axially secured by means of a clamping nut 30 which is screwed into the cup 27 and is adapted to bear on the top of ring 29 and on a shoulder 31 of the bell.

The fluid tightness of the joints is ensured by packing inserted between conical surfaces provided on parts 28, 29, 30 said packing being forced laterally into grooves or slits of the adjacent walls when the parts are screwed together. Such packing is provided at 32 between the nut 30 and angle ring 29, at 33 between bell member 28 and nut 30 and at 34 between the bell member and the sleeve 16. The packing 32 is compressed by the nut 30, whilst packing rings 35 and 36 are screwed down respectively inside the nut member 30 and into the hub of bell 28 in order to compress the packings 33 and 34.

The bell 28, rotating inside the cup 27, carries the pair of blades 19 secured to said bell by means of pins 21, whilst the pair of blades 20 is secured to cup member 27 by means of pins 37. Said rotating bell member is suitably centered and supported on extensive surfaces comprising, at the centre, the sleeve 16 and the packing ring 36, and on the sides the angle ring 29 and also the nut member 30 and the packing ring 35. Wedging actions are thus avoided.

The packing rings 35 and 36 are preferably made of bronze or like suitable anti-friction alloy.

A permanent connection between chamber 14 and peripheral container 13 is obtained by means of holes 24 and 38 respectively provided in the adjacent annular walls of the bell 28 and of the angle ring 29, said holes communicating with each other through part circular grooves 39 preferably formed in the wall of the ring so as to maintain permanent communication between the said holes whatever be the relative angular position of members 28 and 29.

The successive grooves 39 are separated from each other by means of solid portions 40, in order to avoid a short circuit of the oil between the grooves through which oil is forced out of chamber 14 and those through which oil is sucked into the other compartment of said chamber, thus compelling said oil to flow through the peripheral chamber 13.

The shock absorber may comprise two pivoted arms 1 and 2 rocking about the central shaft or bolt 3 and respectively secured to the bell 28 and to the cup 27, or one of the arms may be fixed or it may be replaced by means for fastening the device to the vehicle, more particularly when the shock absorber is to be mounted on vehicles provided with independent wheels, in which case it may be preferable to secure the shock absorber casing directly to the vehicle frame.

For the purpose of attaching arms 1 and 2, the bell member 28 is formed with a central, substantially noncircular boss 41 engaged in an opening of arm 1 which may also be secured to the bell member by means of screws (Fig. 9), while the bottom of cup member 27 is formed with a circular downturned ledge 42 which engages a similar cut away portion of arm 2.

Fig. 10 shows how arm 2 may be formed integral with the cup member 27, and Fig. 11 shows an arm of this type used in a shock absorber having a double arm 1.

In Fig. 12 the arm 1 is bent back so as to form a fastening lug whereby the casing of the shock absorber may be secured at right angles onto the frame of an independent wheel vehicle whilst the free arm 2 is pivotally attached to the wheel drum for instance. The central bolt or shaft 3 may also be employed in order to attach the shock absorber to the vehicle, and other methods of assembly and/or modifications may be devised without departure from the scope of my invention as defined by the appended claims.

I claim:

1. In a hydraulic shock absorber for vehicles, the combination of a casing, a shaft in said casing, a circular wall dividing the inside of said casing into a central circular chamber and an outer annular chamber, two pairs of blades mounted for independent limited angular motion on said shaft, the outer ends of said blades having a substantially fluid-tight engagement with the inner surface of said circular wall, a pair of arms pivoted on said shaft and connected each to one of said pairs of blades, means for closing both said chambers in a fluid tight manner, and a permanently open passage connecting said chambers with each other through constricted holes on either side of each of said pairs of blades.

2. In a hydraulic shock absorber, the combination of a casing comprising an outer cup-shaped member, an inner bell-shaped member having its cavity turned towards said cup-shaped member and an annular member for pressing the edge of said bell-shaped member into frictional engagement with the bottom of said cup-shaped member, said cup-shaped member and said bell-shaped member enclosing a circular chamber, said cup-shaped member and said annular member enclosing an annular chamber, a shaft extending centrally of said circular chamber, a pair of blades secured to said cup-shaped member, a pair of blades secured to said bell-shaped member, and a permanently open passage between said circular chamber and said annular chamber comprising a series of holes through the wall of said bell-shaped member.

3. In a hydraulic shock absorber, the combination of an outer cup-shaped member having a central boss, an inner bell-shaped member rotatable in said cup-shaped member, the hub of said bell-shaped member engaging said boss, the edge of said bell-shaped member engaging the bottom of said cup-shaped member, a threaded angle ring surrounding said bell-shaped member and engaging an inner thread on said cup-shaped member, a nut adapted to be screwed into said cup-shaped member to hold said angle ring and said bell-shaped member, said cup-shaped member and said bell-shaped member enclosing a circular chamber, said cup-shaped member and said angle ring enclosing an annular chamber, radial blades in said circular chamber secured to said cup-shaped member and to said bell-shaped member respectively, a permanently open passage between said circular chamber and said annular chamber comprising a series of holes through the wall of said bell-shaped member and grooves in the wall of said angle ring, and packing respectively between said angle ring and said nut, between said nut and said bell-shaped member and between said bell-shaped member and said hub.

4. In a hydraulic shock absorber, the combination of an outer cup-shaped member having a central boss and an internally threaded wall, an inner bell-shaped member rotatable in said cup-shaped member, said bell-shaped member having a hub engaging said boss and an outer edge engaging the bottom of said cup-shaped member, a threaded angle ring surrounding said bell-shaped member and adapted to be screwed in said cup-shaped member, an edge of said ring bearing on the bottom of said cup-shaped member, a nut adapted to be screwed into said cup-shaped member and bear on said ring and said bell-shaped member, said cup-shaped member and said bell-shaped member enclosing a circular chamber, said cup-shaped member and said angle ring enclosing an annular chamber, pairs of blades in said circular chamber secured to said cup-shaped member and to said bell-shaped member respectively, said blades forming relatively movable and substantially fluid-tight partitions dividing said circular chamber into successive compartments, and grooves in said angle ring forming with holes in the wall of said bell-shaped member and with said annular chamber a permanently open passage between said successive compartments.

CHARLES LACROIX.